(12) United States Patent
Blaum et al.

(10) Patent No.: US 6,985,320 B2
(45) Date of Patent: Jan. 10, 2006

(54) METHOD AND APPARATUS FOR ENCODING DATA TO GUARANTEE ISOLATED TRANSITIONS IN A MAGNETIC RECORDING SYSTEM

(75) Inventors: Mario Blaum, San Jose, CA (US); Glen Alan Jaquette, Tucson, AZ (US); Brian Harry Marcus, Los Altos, CA (US); Constantin Michael Melas, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 10/037,753

(22) Filed: Jan. 2, 2002

(65) Prior Publication Data

US 2003/0123173 A1 Jul. 3, 2003

(51) Int. Cl.
*G11B 5/09* (2006.01)
(52) U.S. Cl. .............................. 360/48; 360/41; 360/51; 360/49; 360/32; 375/266; 341/95; 341/59
(58) Field of Classification Search ................. 360/48, 360/39–40, 49, 41–44; 375/340–341, 355, 375/263, 266; 341/102, 106, 57–59, 81, 341/95; 714/786, 789, 796, 798
See application file for complete search history.

(56) References Cited

U.S. PATENT DOCUMENTS

| 5,173,694 A | * | 12/1992 | Lynch et al. ................... 341/59 |
| 5,291,499 A | | 3/1994 | Behrens et al. |
| 5,341,387 A | | 8/1994 | Nguyen |
| 5,521,945 A | | 5/1996 | Knudson |
| 5,635,933 A | | 6/1997 | Fitzpatrick et al. |
| 5,661,760 A | | 8/1997 | Patapoutian et al. |
| 5,757,294 A | | 5/1998 | Fisher et al. |
| 5,757,822 A | | 5/1998 | Fisher et al. |
| 5,838,738 A | | 11/1998 | Zook |
| 5,844,507 A | | 12/1998 | Zook |
| 5,999,110 A | * | 12/1999 | Blaum et al. .................. 341/59 |
| 6,018,304 A | | 1/2000 | Bessios |
| 6,021,011 A | | 2/2000 | Behrens et al. |
| 6,032,284 A | | 2/2000 | Bliss |
| 6,046,691 A | | 4/2000 | Aziz et al. |

(Continued)

FOREIGN PATENT DOCUMENTS

EP 0751522 1/1997

(Continued)

OTHER PUBLICATIONS

McLaughlin et al, "Codes for Improved Timing Recovery in PR$ and EPR4 Magnetic Recording", Nov. 3-8, 1997, IEEE Global Telecommunications Conference, vol.: 3, pp.: 1235-1239.*

(Continued)

*Primary Examiner*—David Hudspeth
*Assistant Examiner*—Natalia Figueroa
(74) *Attorney, Agent, or Firm*—David W. Victor; Konrad Raynes & Victor LLP

(57) ABSTRACT

Provided is a method, system, and program for storing input groups of uncoded binary data on a storage medium. A plurality of uncoded data blocks in a data stream are received. An encoded data stream is obtained from concatenating successive encoded blocks such that the encoded data stream includes a predetermined bit pattern comprising a plurality of bits. The bit pattern always occurs within a first number of bits and two occurrences of a "1" or "0" occur within a second number of bits. The encoded data blocks are stored on the storage medium.

59 Claims, 7 Drawing Sheets

U.S. PATENT DOCUMENTS

| | | | |
|---|---|---|---|
| 6,072,410 | A | 6/2000 | Kim |
| 6,097,320 | A | 8/2000 | Kuki et al. |
| 6,097,321 | A | 8/2000 | Sayiner |
| 6,115,198 | A * | 9/2000 | Reed et al. .................... 360/46 |
| 6,119,265 | A | 9/2000 | Hara |
| 6,130,629 | A | 10/2000 | Aziz et al. |
| 6,150,964 | A | 11/2000 | McLaughlin |
| 6,157,325 | A | 12/2000 | Kahlman et al. |
| 6,184,806 | B1 | 2/2001 | Patapoutian et al. |
| 6,185,175 | B1 | 2/2001 | Zook |
| 6,246,346 | B1 * | 6/2001 | Cloke et al. ................... 341/59 |
| 6,429,986 | B1 * | 8/2002 | Blaum et al. ................. 360/41 |
| 6,643,814 | B1 * | 11/2003 | Cideciyan et al. .......... 714/755 |

FOREIGN PATENT DOCUMENTS

| | | |
|---|---|---|
| EP | 0764950 | 3/1997 |
| JP | 10027433 | 1/1998 |
| WO | 9418670 | 8/1994 |
| WO | 9708836 | 3/1997 |
| WO | 9716011 | 5/1997 |

OTHER PUBLICATIONS

McPheters et al, "Turbo Codes for PR$ and EPR4 Magnetic Recording", Nov. 1-4, 1998, IEEE Conference Record of the Thirty-Second Asilomar Conference on Signals, Systems & Computers, vol.: 2, pp.: 1778-1782.*

Fredrickson, L. "Synchronization Sequence Detection Using a Modified Trellis Code Viterbi Detector", *IBM Technical Disclosure Bulletin*. vol. 38, No. 6, Jun. 1995. pp. 145-150.

McLaughlin, S. W., P. Lee, and R. Cloke. "Codes for Improved Timing Recovery in *PR4* and *EPR4* Magnetic Recording", *GLOBECOM 97. IEEE Global Telecommunications Conference*. vol. 3, 1997. p. 1235-9. (Abs.).

McLaughlin, Steven W., Patrick Lee, Robert Cloke, & Bane V. Basic. "One-Pairs Codes for Partial Response Magnetic Recording". *IEEE Transactions on Magnetics*, vol. 35, No. 3, May 1999. pp. 2080-2086.

U.S. Appl. No. 10/038,163, filed Jan. 2, 2002, entitled "Method, System, and Program for Synchronization and Resychronization of a Data Stream", inventor by M. Blaum, G.A. Jaquette, B.H. Marcus, and C.M. Melas.

* cited by examiner

FIG. 3

Modulation Code 300

| Uncoded Blocks 310 | Encoded Blocks 320 | Uncoded Blocks 310 | Encoded Blocks 320 | Uncoded Blocks 310 | Encoded Blocks 320 |
|---|---|---|---|---|---|
| 00000000 | 100000010 | 00101100 | 100101100 | 01011000 | 110110100 |
| 00000001 | 010000001 | 00101101 | 100101101 | 01011001 | 110110101 |
| 00000010 | 010001110 | 00101110 | 110100010 | 01011010 | 100111010 |
| 00000011 | 110000010 | 00101111 | 110100011 | 01011011 | 101111010 |
| 00000100 | 000100001 | 00110000 | 110101100 | 01011100 | 100001000 |
| 00000101 | 000101110 | 00110001 | 110101101 | 01011101 | 100001001 |
| 00000110 | 010100001 | 00110010 | 001000010 | 01011110 | 100001010 |
| 00000111 | 100100001 | 00110011 | 001000011 | 01011111 | 100001011 |
| 00001000 | 100101110 | 00110100 | 001001100 | 01100000 | 010000100 |
| 00001001 | 110100001 | 00110101 | 001001101 | 01100001 | 010000101 |
| 00001010 | 110101110 | 00110110 | 101000010 | 01100010 | 010000110 |
| 00001011 | 001000001 | 00110111 | 101000011 | 01100011 | 010000111 |
| 00001100 | 001001110 | 00111000 | 101001100 | 01100100 | 010001000 |
| 00001101 | 101000001 | 00111001 | 101001101 | 01100101 | 010001001 |
| 00001110 | 101001110 | 00111010 | 001100010 | 01100110 | 010001010 |
| 00001111 | 111000010 | 00111011 | 101100010 | 01100111 | 010001011 |
| 00010000 | 001010001 | 00111100 | 011000010 | 01101000 | 110001000 |
| 00010001 | 100010001 | 00111101 | 011100010 | 01101001 | 110001001 |
| 00010010 | 100011010 | 00111110 | 111000100 | 01101010 | 110001010 |
| 00010011 | 010011110 | 00111111 | 111000101 | 01101011 | 110001011 |
| 00010100 | 110011010 | 01000000 | 001010010 | 01101100 | 000100100 |
| 00010101 | 010111110 | 01000001 | 001010011 | 01101101 | 000100101 |
| 00010110 | 011110010 | 01000010 | 100010100 | 01101110 | 000100110 |
| 00010111 | 011111010 | 01000011 | 100010101 | 01101111 | 000100111 |
| 00011000 | 110110010 | 01000100 | 101010001 | 01110000 | 000101000 |
| 00011001 | 110111010 | 01000101 | 101010100 | 01110001 | 000101001 |
| 00011010 | 100000100 | 01000110 | 010011100 | 01110010 | 000101010 |
| 00011011 | 100000101 | 01000111 | 010011101 | 01110011 | 000101011 |
| 00011100 | 010000010 | 01001000 | 001011110 | 01110100 | 010100100 |
| 00011101 | 010000011 | 01001001 | 101011110 | 01110101 | 010100101 |
| 00011110 | 010001100 | 01001010 | 011011010 | 01110110 | 010100110 |
| 00011111 | 010001101 | 01001011 | 111011010 | 01110111 | 010100111 |
| 00100000 | 110000100 | 01001100 | 000110010 | 01111000 | 010001000 |
| 00100001 | 110000101 | 01001101 | 001110010 | 01111001 | 010101001 |
| 00100010 | 000100010 | 01001110 | 000111010 | 01111010 | 010101100 |
| 00100011 | 000100011 | 01001111 | 001111010 | 01111011 | 010101101 |
| 00100100 | 000101100 | 01010000 | 010110010 | 01111100 | 100100100 |
| 00100101 | 000101101 | 01010001 | 010110011 | 01111101 | 100100101 |
| 00100110 | 010100010 | 01010010 | 010111100 | 01111110 | 100100110 |
| 00100111 | 010100011 | 01010011 | 010111101 | 01111111 | 100100111 |
| 00101000 | 010101011 | 01010100 | 011110100 | 10000000 | 100101000 |
| 00101001 | 010101110 | 01010101 | 011110101 | 10000001 | 100101001 |
| 00101010 | 100100010 | 01010110 | 100110010 | 10000010 | 100101010 |
| 00101011 | 100100011 | 01010111 | 101110010 | 10000011 | 100101011 |

FIG. 3 (con't)

Modulation Code 300 (con't)

| Uncoded Blocks 310 | Encoded Blocks 320 | Uncoded Blocks 310 | Encoded Blocks 320 | Uncoded Blocks 310 | Encoded Blocks 320 |
|---|---|---|---|---|---|
| 10000100 | 110100100 | 10110000 | 010011000 | 11011100 | 100010110 |
| 10000101 | 110100101 | 10110001 | 010011001 | 11011101 | 100010111 |
| 10000110 | 110100110 | 10110010 | 010011010 | 11011110 | 101010110 |
| 10000111 | 110100111 | 10110011 | 010011011 | 11011111 | 101010111 |
| 10001000 | 110101000 | 10110100 | 001011100 | 11100000 | 010010010 |
| 10001001 | 110101001 | 10110101 | 001011101 | 11100001 | 010010011 |
| 10001010 | 110101010 | 10110110 | 101011100 | 11100010 | 011010010 |
| 10001011 | 110101011 | 10110111 | 101011101 | 11100011 | 011010011 |
| 10001100 | 001000100 | 10111000 | 000110100 | 11100100 | 110010010 |
| 10001101 | 001000101 | 10111001 | 000110101 | 11100101 | 110010011 |
| 10001110 | 001000110 | 10111010 | 001110100 | 11100110 | 111010010 |
| 10001111 | 001000111 | 10111011 | 001110101 | 11100111 | 111010011 |
| 10010000 | 001001000 | 10111100 | 010110100 | 11101000 | 001011000 |
| 10010001 | 001001001 | 10111101 | 010110101 | 11101001 | 001011001 |
| 10010010 | 001001010 | 10111110 | 010110110 | 11101010 | 001011010 |
| 10010011 | 001001011 | 10111111 | 010110111 | 11101011 | 001011011 |
| 10010100 | 101000100 | 11000000 | 010111000 | 11101100 | 101011000 |
| 10010101 | 101000101 | 11000001 | 010111001 | 11101101 | 101011001 |
| 10010110 | 101000110 | 11000010 | 010111010 | 11101110 | 101011010 |
| 10010111 | 101000111 | 11000011 | 010111011 | 11101111 | 101011011 |
| 10011000 | 101001000 | 11000100 | 100110100 | 11110000 | 010010100 |
| 10011001 | 101001001 | 11000101 | 100110101 | 11110001 | 010010101 |
| 10011010 | 101001010 | 11000110 | 101110100 | 11110010 | 010010110 |
| 10011011 | 101001011 | 11000111 | 101110101 | 11110011 | 010010111 |
| 10011100 | 001100100 | 11001000 | 001101000 | 11110100 | 110010100 |
| 10011101 | 001100101 | 11001001 | 001101001 | 11110101 | 110010101 |
| 10011110 | 101100100 | 11001010 | 001101010 | 11110110 | 110010110 |
| 10011111 | 101100101 | 11001011 | 001101011 | 11110111 | 110010111 |
| 10100000 | 111001000 | 11001100 | 101101000 | 11111000 | 011010100 |
| 10100001 | 111001001 | 11001101 | 101101001 | 11111001 | 011010101 |
| 10100010 | 111001010 | 11001110 | 101101010 | 11111010 | 011010110 |
| 10100011 | 111001011 | 11001111 | 101101011 | 11111011 | 011010111 |
| 10100100 | 011000100 | 11010000 | 011001000 | 11111100 | 111010100 |
| 10100101 | 011000101 | 11010001 | 011001001 | 11111101 | 111010101 |
| 10100110 | 011100100 | 11010010 | 011001010 | 11111110 | 111010110 |
| 10100111 | 011100101 | 11010011 | 011001011 | 11111111 | 111010111 |
| 10101000 | 001010100 | 11010100 | 011101000 | | |
| 10101001 | 001010101 | 11010101 | 011101001 | | |
| 10101010 | 001010110 | 11010110 | 011101010 | | |
| 10101011 | 001010111 | 11010111 | 011101011 | | |
| 10101100 | 010010001 | 11011000 | 100010010 | | |
| 10101101 | 110010001 | 11011001 | 100010011 | | |
| 10101110 | 011010001 | 11011010 | 101010010 | | |
| 10101111 | 111010001 | 11011011 | 101010011 | | |

FIG. 5

Modulation Code 500*

| Unencoded Blocks 510 | | | | | | | | | → | Encoded Blocks 520 | | | | | | | | | |
|---|---|---|---|---|---|---|---|---|---|---|---|---|---|---|---|---|---|---|---|
| 0 | 0 | $a_2$ | $a_3$ | $a_4$ | $a_5$ | $a_6$ | $a_7$ | $a_8$ | → | 1 | 0 | $a_3$ | 1 | 1 | 1 | $a_6$ | $a_7$ | $a_8$ | 1 |
| 0 | 1 | 0 | $a_3$ | $a_4$ | $a_5$ | $a_6$ | $a_7$ | $a_8$ | → | 0 | 1 | 1 | 1 | 1 | $a_5$ | $a_6$ | $a_7$ | $a_8$ | 1 |
| 1 | 0 | 0 | $a_3$ | $a_4$ | $a_5$ | $a_6$ | $a_7$ | $a_8$ | → | $a_3$ | 1 | 1 | 1 | 1 | $a_5$ | $a_6$ | $a_7$ | $a_8$ | 1 |
| 0 | 0 | 1 | $a_3$ | $a_4$ | $a_5$ | $a_6$ | $a_7$ | $a_8$ | → | $a_3$ | 0 | 0 | 1 | 1 | $a_5$ | $a_6$ | $a_7$ | $a_8$ | 1 |
| 1 | 1 | 0 | $a_3$ | $a_4$ | $a_5$ | $a_6$ | $a_7$ | $a_8$ | → | $a_5$ | $a_4$ | 1 | 0 | 0 | 1 | $a_6$ | $a_7$ | $a_8$ | 1 |
| 0 | 1 | 1 | 0 | $a_4$ | $a_5$ | $a_6$ | $a_7$ | $a_8$ | → | 0 | $a_4$ | 0 | 1 | 1 | 1 | $a_6$ | $a_7$ | $a_8$ | 1 |
| 1 | 0 | 1 | 1 | $a_4$ | $a_5$ | $a_6$ | $a_7$ | $a_8$ | → | $a_5$ | 0 | 1 | 1 | 1 | 1 | $a_6$ | $a_7$ | $a_8$ | 1 |
| 1 | 1 | 1 | 1 | 0 | $a_5$ | $a_6$ | $a_7$ | $a_8$ | → | $a_5$ | 1 | 1 | 1 | 1 | 1 | 1 | $a_7$ | $a_8$ | 1 |
| 1 | 1 | 1 | 1 | 1 | 0 | $a_6$ | $a_7$ | $a_8$ | → | 0 | $a_5$ | 0 | 0 | 1 | 1 | 1 | $a_7$ | $a_8$ | 1 |
| 1 | 1 | 1 | 1 | $a_5$ | 1 | 0 | $a_7$ | $a_8$ | → | $a_4$ | 1 | 0 | 0 | 1 | 1 | 1 | 1 | $a_8$ | 1 |
| 1 | 1 | 1 | 0 | 0 | 1 | $a_6$ | $a_7$ | $a_8$ | → | $a_6$ | 0 | 1 | 0 | 0 | 1 | 1 | 1 | $a_8$ | 1 |
| 1 | 1 | 1 | 1 | 1 | 1 | 0 | $a_7$ | $a_8$ | → | $a_7$ | 1 | 0 | 1 | 0 | 1 | 1 | 1 | $a_8$ | 1 |
| 1 | 1 | 1 | 0 | 1 | 0 | 1 | $a_7$ | $a_8$ | → | 0 | 0 | 0 | 0 | 0 | 1 | $a_6$ | 1 | $a_8$ | 1 |
| 1 | 1 | 1 | 1 | 0 | 1 | 1 | $a_7$ | $a_8$ | → | $a_5$ | 1 | 0 | 1 | 0 | 0 | 1 | 1 | $a_8$ | 1 |
| 1 | 1 | 1 | 0 | 1 | 1 | 0 | $a_7$ | $a_8$ | → | $a_7$ | 0 | $a_7$ | $a_7$ | $a_6$ | 1 | 1 | 1 | $a_8$ | 1 |
| 1 | 1 | 1 | $a_5$ | 1 | 1 | 1 | 0 | $a_8$ | → | 0 | 0 | 0 | 0 | 0 | 0 | 1 | 1 | $a_8$ | 1 |
| 1 | 1 | 1 | 1 | 1 | 1 | 1 | 1 | 0 | → | $a_5$ | 1 | 1 | $a_7$ | 1 | 1 | 1 | 1 | 1 | 1 |
| 1 | 1 | 1 | 1 | 1 | 1 | 1 | 1 | 1 | → | $a_6$ | 0 | 0 | $a_8$ | 0 | 1 | 1 | 1 | 1 | 1 |
| 1 | 1 | 1 | 1 | 1 | 1 | 1 | 1 | 1 | → | $a_6$ | $a_7$ | 1 | $a_8$ | 0 | 1 | 1 | 1 | 1 | 1 |
| 1 | 1 | 1 | 1 | 1 | 1 | 1 | 1 | 1 | → | $a_6$ | 0 | 0 | $a_8$ | 0 | 1 | 1 | 1 | 1 | 1 |
| 1 | 1 | 1 | 1 | 1 | 1 | 1 | 1 | 1 | → | $a_6$ | $a_7$ | 1 | $a_8$ | 0 | 1 | 1 | 1 | 1 | 1 |

*The above modulation code 500 may be used, in certain implementations, for all 9 bit unencoded blocks except for the block "001111111", which in certain cases encodes instead to the 10 bit block "0110000111".

FIG. 6

METHOD AND APPARATUS FOR ENCODING DATA TO GUARANTEE ISOLATED TRANSITIONS IN A MAGNETIC RECORDING SYSTEM

RELATED APPLICATIONS

This application is related to the copending and commonly assigned U.S. patent application entitled "Method, System, and Program for Synchronization and Resynchronization of a Data Stream", having Ser. No. 10/038,163, which patent application was filed on the same date herewith and is incorporated herein by reference in its entirety.

BACKGROUND OF THE INVENTION

1. Field of the Invention

The present invention relates to a method and apparatus for storing data in a storage medium. More specifically, the present invention relates to gain and timing control in storing data in a storage medium.

2. Description of the Related Art

In data recording systems, a data drive writes positive and negative "flux transitions" to the medium. A "one" bit ("1") represents a peak or trough in the signal while a "zero" bit ("0") indicates that no signal is present. These flux transitions within a data stream can be used to provide feedback for timing and gain control loops. However, if a string of zeros exist for too long, a phase change may not be detected, causing errors in the recording system. This problem can be avoided if the data is encoded so that a "1" is guaranteed to occur at a definite minimum frequency. This is the purpose of modulation coding subject to a classical runlength limited k-constraint.

But there may be advantages to using timing marks or gain control marks other than the symbol "1." In the 1999 publication "One-Pairs Codes for Partial Response Magnetic Recording," IEEE Transactions on Magnetics, Vol. 35, No. 3, May 1999, the use of a pair of 1s (i.e. "11") is described to perform timing recovery for readback of information stored on magnetic recording media in a partial response channel. Still other channel models may benefit from a different encoding system to provide additional features, but the systems are limited to the available control marks and coding blocks in the prior art.

Thus, there is a need in the art to provide more sophisticated timing and gain control marks and/or improved coding algorithms for encoding and storing data in a storage medium.

SUMMARY OF THE PREFERRED EMBODIMENTS

Provided is a method, system, and program for storing input groups of uncoded binary data on a storage medium. A plurality of uncoded data blocks in a data stream are received. An encoded data stream is obtained from concatenating successive encoded blocks such that the encoded data stream includes a predetermined bit pattern comprising a plurality of bits. The bit pattern always occurs within a first number of bits and two occurrences of a "1" or "0" occur within a second number of bits. The encoded data stream is stored on the storage medium.

In further implementations, the predetermined bit pattern comprises "010". In such case, each uncoded data block may comprise eight bits and each encoded data block may comprise nine bits. Still further, each uncoded data block may comprise sixteen bits and each encoded data block may comprise seventeen bits.

In still further implementations, the predetermined bit pattern may comprise "111". In such case, each uncoded data block comprises nine bits and each encoded data block comprises ten bits.

Still further, the predetermined bit pattern may comprise either "0100" or "0010". In such case, each uncoded data block comprises sixteen bits, each encoded data block comprises seventeen bits, and the first number comprises fifteen bits.

In further implementations, the predetermined bit pattern comprises 111 and the m/n rate coded block comprises a 9/10 rate coded block. In still further implementation, the predetermined bit pattern comprises either 0010 or 0100, and the m/n rate coded block comprises a 9/10 rate coded block.

The described implementations provide a technique to encode uncoded binary data at a guaranteed minimum frequency rate using predetermined binary patterns representing peaks in an analog waveform which can provide improved timing and gain control.

BRIEF DESCRIPTION OF THE DRAWINGS

Referring now to the drawings in which like reference numbers represent corresponding parts throughout:

FIG. 3 illustrates an encoding table using a "001" binary pattern in accordance with implementations of the invention;

FIG. 5 illustrates an encoding table using a "111" binary pattern in accordance with implementations of the invention; and FIG. 6 illustrates an encoding table using a "0100" or "0010" binary patterns in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
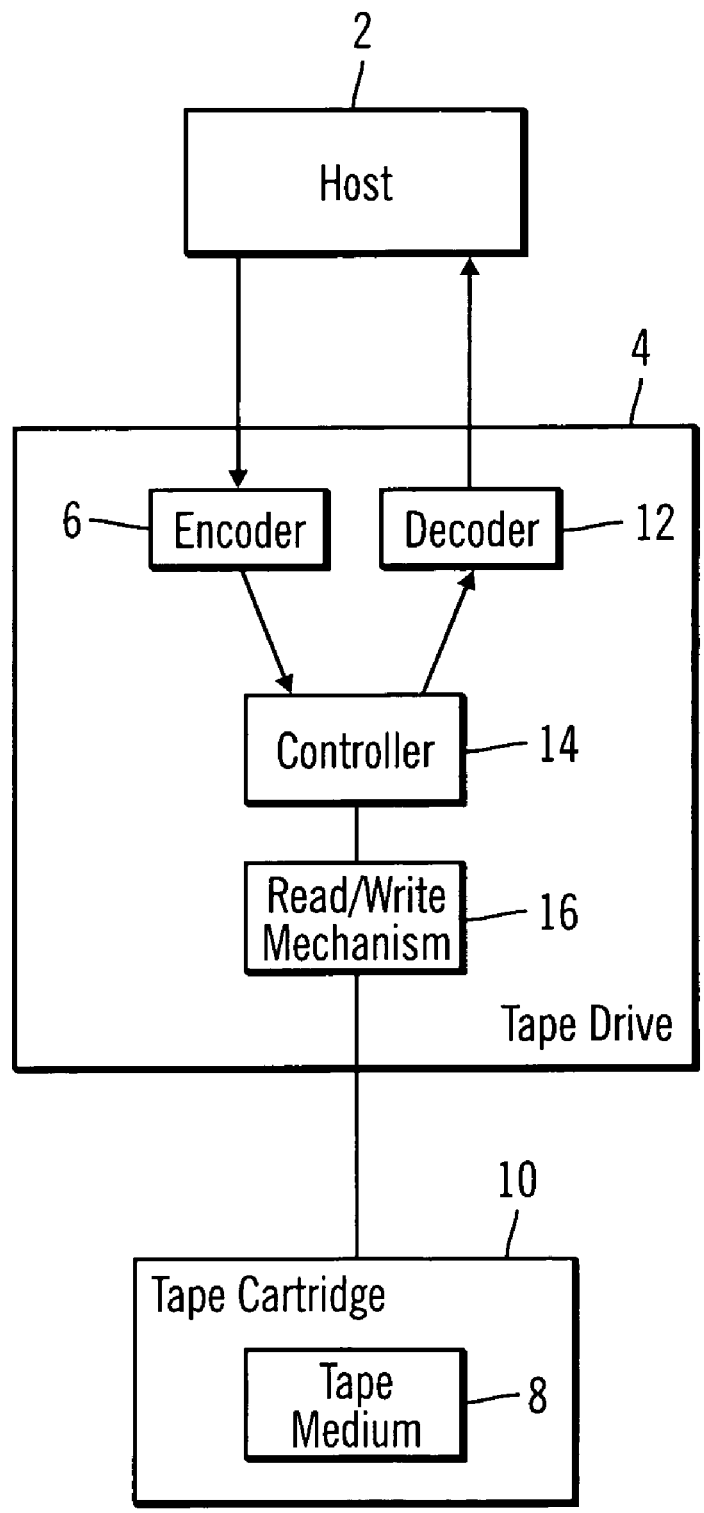
FIG. 1 illustrates a storage environment in which aspects of the invention are implemented.

FIG. 1 illustrates a tape storage environment in which aspects of the invention are implemented. A host system 2 is in communication with a tape drive 4. The tape drive 4 may be a component within the host system 2 enclosure or a drive within a tape library or tape server that the host system 2 communicates with over a network (not shown). The tape drive 4 includes an encoder 6 to encode data received from the host 2 that is to be written on tape medium 8 in a tape cartridge 10 engaged with the tape drive 4. The tape drive 4 further includes a decoder 12 to decode data stored on the tape medium 8 to return to the host system 2. A controller 14 within the tape drive 4 drives a read/write mechanism 16 to perform read and write operations with respect to encoded data on the tape medium 8 in a manner known in the art. The encoder 6 and decoder 12 may be implemented as separate hardware components external to the controller 14 or implemented within logic executed by the controller 14.

In alternative implementations, the tape drive 4 may comprise other types of storage devices, such as a hard disk drive, optical disk or other device for reading and writing data to a non-volatile storage medium. In the described implementations, the tape medium 8 comprises a magnetic or digital tape.

Figure 2:
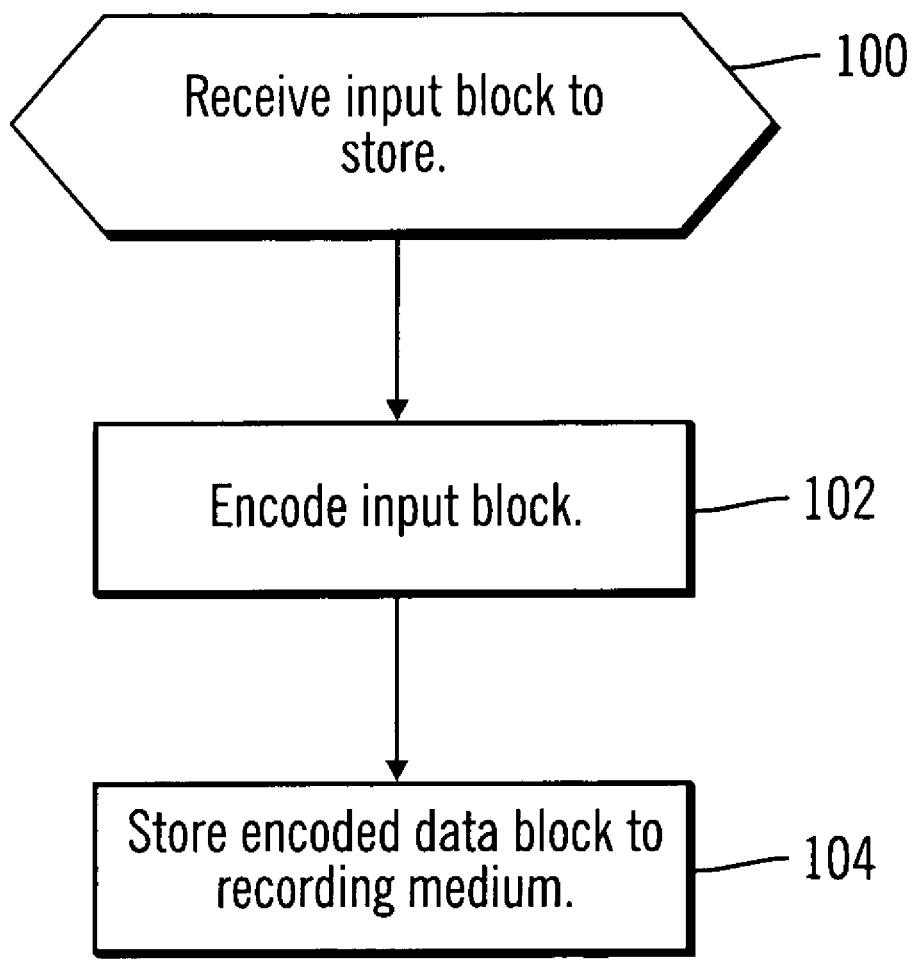
FIG. 2 illustrates a data flow implemented in the encoder to encode and store a block of uncoded binary user data in accordance with implementations of the invention.

FIG. 2 illustrates the data flow implemented in the encoder 6 to encode and store a block of uncoded binary user data in accordance with one implementation of the invention. Control begins at block 100 when the encoder 6 receives a block of binary user data for storage on the medium 100. Next, at block 102, the encoder encodes the block of binary user data in preparation for storage on the tape medium 8. Specifically, the encoder 6 encodes each word of the binary data block using an "m/n rate code block." Under this coding scheme, which is shown in FIG. 3, "m" represents the number of bits in a "group" of uncoded binary user bits 310 to be encoded, and the "n" represents the number of bits in the corresponding "group" of encoded bits 320. Each group of "n" encoded bits 320 contains at least one binary pattern that enables improved reliability of gain and timing control operations, as discussed below in more detail. After the encoder 6 individually encodes groups of uncoded binary user data 310, the encoded data 320 is stored on the tape medium 8 at block 104. More particularly, the read/write mechanism 16 stores binary flux transitions corresponding to the encoded binary bit block to the recording medium 100. The storing of the data can be performed using known techniques in the art.

FIG. 3 illustrates a modulation code table 300 implemented in the encoder 6 and decoder 12 to respectively encode and decode data. The modulation code table 300 provides a high rate modulation to encode the arbitrary binary data blocks 310 into encoded blocks 320 at an 8/9 code rate (i.e. a "group" of uncoded bits includes 8 bits and a "group" of encoded bits includes 9 bits). More specifically, a "group" of uncoded binary user data occupies 8 bits, encompassing all possible input combinations from "00000000" to "11111111." Each "group" of encoded bits occupies nine bits, and contains at least one predetermined binary pattern, also referred to as "timing (or gain) control marks" or simply "marks." In the implementation of FIG. 3, the predetermined binary pattern "010" is used, which represents an isolated peak in an analog readback waveform. For extended partial response channels, the pattern "010" provides much greater reliability than simply a "1" in the classical k-constraint or "11" described in the IEEE publication "One-Pairs Codes for Partial Response Magnetic Recording."

Figure 4:
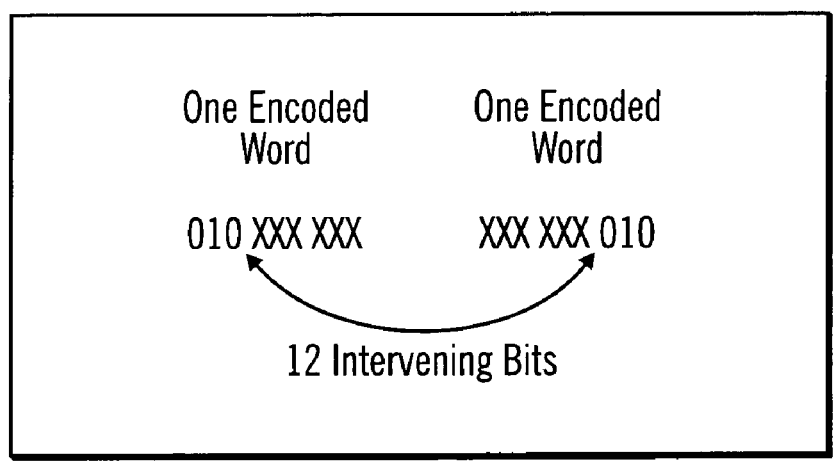
FIG. 4 illustrates the maximum separation between consecutive peaks embodied by the "010" binary pattern in accordance with implementations of the invention.

In the implementation of FIG. 3, the predetermined pattern "010" is guaranteed to occur within each encoded data block 320 such that the binary patterns (i.e. "010") from two neighboring encoded groups cannot be separated by more than 12 intervening bits in a traditional PR4 ("Partial Response") system, as shown by FIG. 4. Further, with the modulation pattern of FIG. 3, the maximum gap between two occurrences of "1" and two occurrences of "0" is 6 bits, as can be shown by examining FIG. 3. Accordingly, the "010" pattern occurs in the encoded bit stream with a guaranteed number of bits and any two occurrences of "1" and two occurrences of "0" occur within a number of bits less that is less than the maximum number of bits between the "010" pattern. This ensures that a maximum possible amplitude occurs between instances of the predetermined number of bits, i.e., predetermined frequency, in a manner that isolates peaks and aid in analog gain control and digital timing recovery. Also, because the maximum gap between two occurrences of "1" and two occurrences of "0" is 6 bits, this code satisfies a traditional PRML G constraint, which aids in traditional PR4 timing algorithms. Moreover, this code satisfies a traditional I constraint, which helps to limit the Viterbi path memory. Moreover, the code avoids an indefinite run of the VFO field (by excluding the two words (010101010 and 101010101).

In designing a code, the following goals should be considered: the ease with which the code can be decoded; the compatibility of the binary pattern with the system; occurrence at a sufficiently a high frequency, or within a relatively low predetermined number of bits; and the ability to consider noise enhancement, channel impulse response, and implementation complexity. The code described in FIG. 3 provides a high frequency rate, low complexity, and very little error propagation.

The 8/9 block codes described in FIG. 3 can readily be extended to an extended block code having a 16/17 bit code rate. By appending additional eight bits to the encoded nine bits by alternating encoded bytes with uncoded bytes, a block code using a 16/17 bit code rate is also available. With this 16/17 bit encoding scheme, the binary patterns (i.e. "010") from two neighboring encoded groups cannot be separated by more than 20 intervening bits in a traditional PR4 ("Partial Response") system, and the maximum gap between two occurrences of "1" and two occurrences of "0" is 14 bits.

The 16/17 bit code rate may be implemented as a block coded sequence or finite state code sequence. In the block coded sequence implementation, there is a one-to-one correspondence of uncoded blocks to encoded blocks. In a finite state code implementation, the same uncoded block may be represented by two different encoded blocks or one encoded block can represent two different uncoded blocks, and ambiguity is resolved by looking at adjacent blocks.

FIG. 5 illustrates an encoding table using an alternative "111" binary pattern in accordance with implementations of the invention. In the preferred implementations, a high rate modulation code 500 is used to encode the arbitrary binary data blocks 510 into encoded blocks 520 at a 9/10 code rate (i.e. a "group" of uncoded bits includes 9 bits and a "group" of encoded bits comprises 10 bits). Each subscripted "a" character refers to the value of a bit of the uncoded group 510, where the subscript identifies the bit's position in the group 510. For example, $a_0$ identifies the binary "0" or "1" located at the first bit position of the uncoded group 510. In FIG. 5, all possible uncoded groups 510 and the corresponding output encoded groups 520 are shown. In the PR4 system, the first and last ones must have opposite signs, on either side of a waveform peak, and two consecutive ones of opposite sign, on either side of a zero crossing. For instance, if the first one in "111" corresponds to +1, then the third one corresponds to −1. Thus, there are going to be two consecutive ones having the same sign, corresponding to a peak in PR4. The modulation code 500 ensures that the binary pattern "111" appears in each encoded data block 520. With this encoding scheme, the binary patterns (i.e. "111") from two neighboring encoded groups cannot be separated by more than 14 intervening bits at a 9/10 bit code rate and 21 intervening bits in an extended 16/17 bit code rate. In order to obtain a 16/17 code, seven bits are added. In certain implementations, the encoding table of FIG. 5 is to be used for all nine bit unencoded blocks except for the block "001111111", which encodes instead to the ten bit block "0110000111". This ensures that every codeword contains both a "0" and a "1" Otherwise, other factors must be used to select the uncoded to encoded block correspondence, such as the case with a finite state coding.

Figure 6:
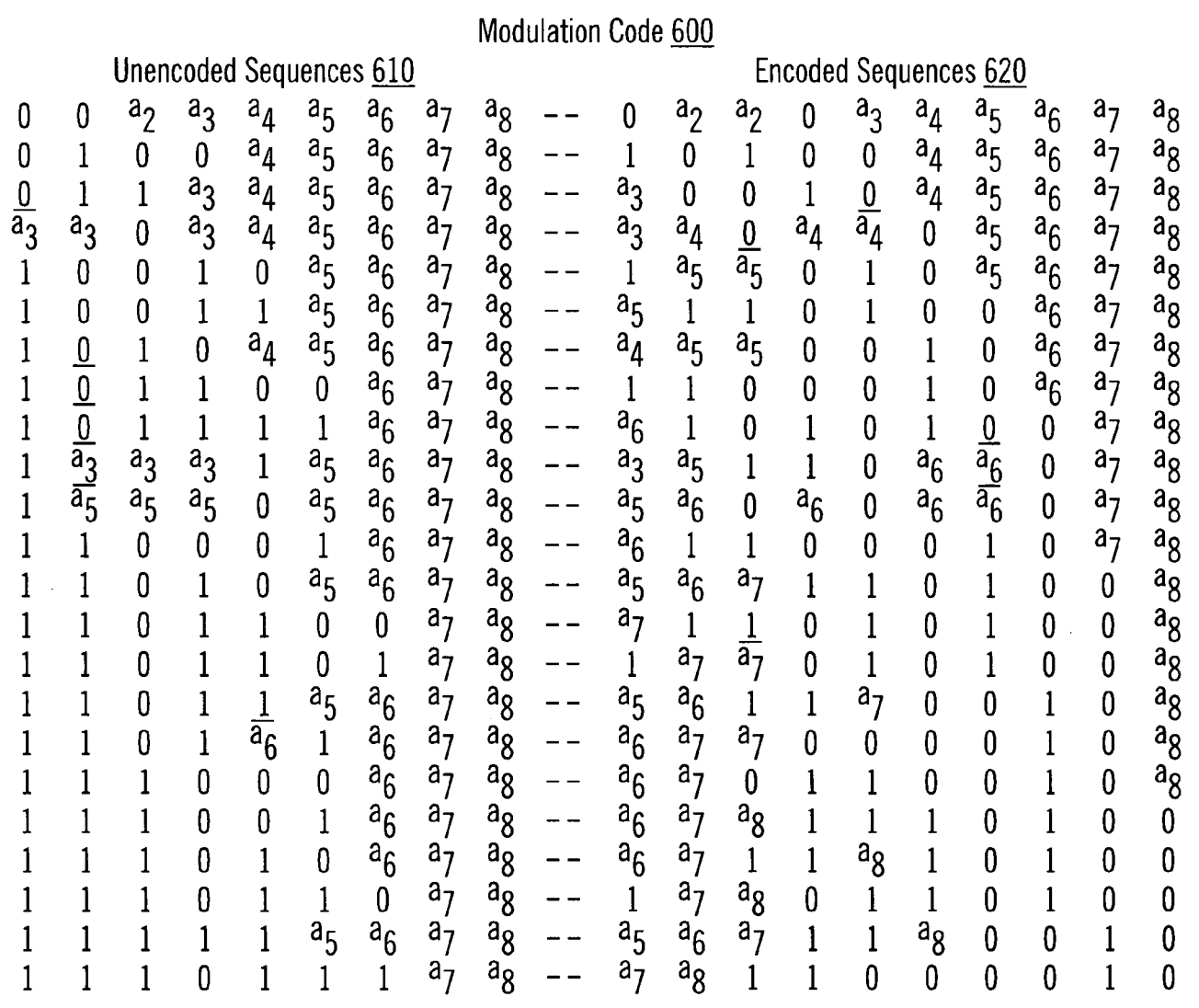

FIG. 6 illustrates an encoding table using an alternative "0100" or "0010" binary patterns in accordance with further implementations of the invention. In the preferred implementations, a high rate modulation code 600 is used to encode the arbitrary binary data blocks 610 into encoded blocks 620 at a 9/10 code rate (i.e. a "group" of uncoded bits includes 9 bits and a "group" of encoded bits includes 10 bits). As in FIG. 5, each subscripted "a" character refers to the value of a bit of the uncoded group 610, where the subscript identifies the bit's position in the group 610. In FIG. 6, all possible uncoded groups 610 and the corresponding output encoded groups 620 are shown. The modulation code 600 ensures that the binary pattern "0100" or "0010" appears in each encoded data block 520. The binary patterns "0100" or "0010" are suitable for implementation in NRZI, giving peaks both in EPR4 ("Extended Partial Response") and $E^2$PR4 ("Extended Partial Response 2") systems. Moreover, using longer binary patterns "0100" or "0010" can increase the frequency of the timing mark in the encoded data. By using alternative timing marks within a single block code, the binary patterns (i.e. "0100" or "0010") from two neighboring encoded groups cannot be separated by more than 12 intervening bits for the 9/10 bit code rate and 19 intervening bits for the extended 16/17 bit code rate, rather than 20 intervening bits in a code block using a single timing mark.

ADDITIONAL IMPLEMENTATION DETAILS

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the encoding process was described with respect to encoding the uncoded binary user data into encoded data. The present invention also encompasses decoding the encoded data back to the uncoded binary user data using the same block codes because the encoders are one-to-one correspondences. Additional hardware may be used in the readback process including a decoder. More specifically, the decoder decodes the encoded bit stream by reversing the translation of FIG. 3 to effectively decode each encoded group of bits back into an uncoded 8-bit group. Similarly, the decoder can reverse the translation of FIGS. 5 and 6 to effectively decode each encoded group of bits back into an uncoded 9-bit group. For finite-state codes, certain encoded words may represent more than one possible uncoded bit group, the decoder may apply known methods (i.e. look at the next code word) to determine the correct translation.

In certain described implementations, the encoder tables provide a one-to-one correspondence of uncoded to encoded blocks. In alternative implementations, finite-state codes can be used instead of the block code using finite-state encoders. A finite-state encoder will encode each user data block into a block that satisfies the given constraint of the system at some rate m/n. Each m-bit user input is encoded into an n-bit codeword as a function of the current state (as well as the user input), wherein the state transition consists of an initial state, terminal state, m-bit input and n-bit codeword. In finite-state coding schemes, the same encoded codeword can correspond to two different uncoded user data blocks (providing such benefits as a higher frequency rate and smaller gap distance between timing marks vs. the costs of increased complexity) and one uncoded block can correspond to two encoded blocks. In finite-state codes, the state information is used to determine how to properly decode the encoded data, i.e., by using the value of adjacent blocks to determine the uncoded to coded block mapping.

The described implementations provide a technique for transferring data to a tape drive. The above described logic may be used with other input/output (I/O) devices or other storage devices, e.g., optical tape, magnetic tape, magnetic disk, etc.

The logic implementation of FIG. 2 described specific operations as occurring in a particular order. In alternative implementations, certain of the flow operations may be performed in a different order, modified or removed and still implement preferred embodiments of the present invention. Morever, steps may be added to the above described flow and still conform to implementations of the invention.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for storing input groups of uncoded binary data on a storage medium, comprising:
   receiving a plurality of uncoded data blocks in a data stream;
   generating one corresponding encoded data block for each uncoded data block, wherein an encoded data stream obtained from concatenating successive encoded blocks includes a predetermined bit pattern comprising a plurality of bits, wherein the bit pattern always occurs within a first number of bits and two occurrences of a "1" and "0" always occur within a second number of bits; and storing the encoded data stream on the storage medium.

2. The method of claim 1, wherein the predetermined bit pattern represents a maximum amplitude peak in a constrained waveform that is guaranteed to occur within the first number of bits.

3. The method of claim 1, wherein the encoded data blocks are generated using an encoder table.

4. The method of claim 1, further comprising:
decoding the encoded data block by determining the decoded data block corresponding to the encoded data block.

5. The method of claim 1, wherein the encoding function is performed by a finite state code.

6. The method of claim 5, wherein one encoded data block corresponds to multiple uncoded data blocks, and wherein a value of at least one adjacent block is used to determine the uncoded data block that corresponds to the encoded data block corresponding to multiple uncoded data blocks.

7. The method of claim 1, wherein the predetermined bit pattern comprises "010", each uncoded data block comprises eight bits, and each encoded data block comprises nine bits.

8. The method of claim 7, wherein the first number comprises twelve and the second number comprises six.

9. The method of claim 1, wherein the predetermined bit pattern comprises "010", wherein each uncoded data block comprises sixteen bits and wherein each encoded data block comprises seventeen bits.

10. The method of claim 9, wherein the first number comprises twenty bits and the second number comprises fourteen bits.

11. The method of claim 9, wherein a correspondence of uncoded to encoded data blocks comprises a finite state code scheme.

12. The method of claim 1, wherein the predetermined bit pattern comprises "111", wherein each uncoded data block comprises nine bits and wherein each encoded data block comprises ten bits.

13. The method of claim 12, wherein the first number is fourteen.

14. The method of claim 1, wherein the predetermined bit pattern comprises "111", wherein each uncoded data block comprises sixteen bits, and wherein each encoded data block comprises seventeen bits.

15. The method of claim 14, wherein the first number is twenty-one.

16. The method of claim 14, wherein a correspondence of uncoded to encoded data blocks comprises a finite state code scheme.

17. The method of claim 1, wherein the predetermined bit pattern comprises either "0100" or "0010", wherein each uncoded data block comprises nine bits and wherein each encoded data block comprises ten bits.

18. The method of claim 17, wherein the first number is twelve.

19. The method of claim 1, wherein the predetermined bit pattern comprises either "0100" or "0010", wherein each uncoded data block comprises sixteen bits.

20. The method of claim 19, wherein each encoded data block comprises seventeen bits and wherein the firm number comprises nineteen bits.

21. The method of claim 19, wherein a correspondence of uncoded to encoded data blocks comprises a finite state code scheme and wherein the first number is fifteen.

22. The method of claim 1, wherein the predetermined bit pattern is included in one encoded data block or spans two encoded data blocks.

23. A method for storing input groups of uncoded binary data on a storage medium, comprising:
receiving a plurality of uncoded data blocks in a data stream;
generating one corresponding encoded data block for each uncoded data block, wherein an encoded data stream obtained from concatenating successive encoded blocks includes a predetermined bit pattern comprising a plurality of bits, wherein the bit pattern always occurs within a first number of bits, and two occurrences of a "1" and "0" occur within a second number of bits, wherein the first number is greater than the second number; and
storing the encoded data stream on the storage medium.

24. A method for storing input groups of uncoded binary data on a storage medium, comprising:
receiving a plurality of uncoded data blocks in a data stream;
generating one corresponding encoded data block for each uncoded data block, wherein an encoded data stream obtained from concatenating successive encoded blocks includes a predetermined bit pattern comprising a plurality of bits, wherein the bit pattern always occurs within a first number of bits and two occurrences of a "1" and "0" occur within a second number of bits; and
storing the encoded data stream on the storage medium, wherein the encoded data block can be used in partial response and extended partial response systems.

25. A system for storing input groups of uncoded binary data on a storage medium, comprising:
means for receiving a plurality of uncoded data blocks in a data stream;
means for generating one corresponding encoded data block for each uncoded data block, wherein an encoded data stream obtained from concatenating successive encoded blocks includes a predetermined bit pattern comprising a plurality of bits, wherein the bit pattern always occurs within a first number of bits and two occurrences of a "1" and "0" always occur within a second number of bits; and
means for storing the encoded data stream on the storage medium.

26. The system of claim 25, wherein the predetermined bit pattern represents a maximum amplitude peak in a constrained waveform that is guaranteed to occur within the first number of bits.

27. The system of claim 25, wherein the encoding function is performed by a finite state code.

28. The system of claim 27, wherein one encoded data block corresponds to multiple uncoded data blocks, and wherein a value of at least one adjacent block is used to determine the uncoded data block that corresponds to the encoded data block corresponding to multiple uncoded data blocks.

29. The system of claim 25, wherein the predetermined bit pattern comprises "010" each uncoded data block comprises eight bits, and each encoded data block comprises nine bits.

30. The system of claim 25, wherein the predetermined bit pattern comprises "111", wherein each uncoded data block comprises nine bits and wherein each encoded data block comprises ten bits.

31. The system of claim 25, wherein the predetermined bit pattern comprises "111", wherein each uncoded data block comprises sixteen bits, wherein each encoded data block comprises seventeen bits.

32. The system of claim 25, wherein the predetermined bit pattern comprises either "0100" or "0010" wherein each uncoded data block comprises nine bits and wherein each encoded data block comprises ten bits.

33. The system of claim 25, wherein the predetermined bit pattern is included in one encoded data block or spans two encoded data blocks.

34. A system for storing input groups of uncoded binary data on a storage medium, comprising:
  means for receiving a plurality of uncoded data blocks in a data stream;
  means for generating one corresponding encoded data block for each uncoded data block, wherein an encoded data stream obtained from concatenating successive encoded blocks includes a predetermined bit pattern comprising a plurality of bits, wherein the bit pattern always occurs within a first number of bits and two occurrences of a "1" and "0" occur within a second number of bits, wherein the first number is greater than the second number; and
  means for storing the encoded data stream on the storage medium.

35. An article of manufacture including code for storing input groups of uncoded binary data on a storage medium, wherein the code is capable of causing operations comprising:
  receiving a plurality of uncoded data blocks in a data stream;
  generating one corresponding encoded data block for each uncoded data block, wherein an encoded data stream obtained from, concatenating successive encoded blocks includes a predetermined bit pattern comprising a plurality of bits, wherein the bit pattern always occurs within a first number of bits and two occurrences of a "1" and "0" always occur within a second number of bits; and
  storing the encoded data stream on the storage medium.

36. The article of manufacture of claim 35, wherein the predetermined bit pattern represents a maximum amplitude peak in a constrained waveform that is guaranteed to occur within the first number of bits.

37. The article of manufacture of claim 35, wherein the encoded data blocks are generated using an encoder table.

38. The article of manufacture of claim 35, further comprising:
  decoding the encoded data block by determining the decoded data block corresponding to the encoded data block.

39. The article of manufacture of claim 35, wherein the encoding function is performed by a finite state code.

40. The article of manufacture of claim 39, wherein one encoded data block corresponds to multiple uncoded data blocks, and wherein a value of at least one adjacent block is used to determine the uncoded data block that corresponds to the encoded data block corresponding to multiple uncoded data blocks.

41. The article of manufacture of claim 35, wherein the predetermined bit pattern comprises "010", each uncoded data block comprises eight bits, and each encoded data block comprises nine bits.

42. The article of manufacture of claim 41, wherein the first number comprises twelve and the second number comprises six.

43. The article of manufacture of claim 35, wherein the predetermined bit pattern comprises "010", wherein each uncoded data block comprises sixteen bits and wherein each encoded data block comprises seventeen bits.

44. The article of manufacture of claim 43, wherein the first number comprises twenty bits and the second number comprises fourteen bits.

45. The article of manufacture of claim 43, wherein a correspondence of uncoded to encoded data blocks comprises a finite state code scheme.

46. The article of manufacture of claim 35, wherein the predetermined bit pattern comprises "111", wherein each uncoded data block comprises nine bits and wherein each encoded data block comprises ten bits.

47. The article of manufacture of claim 46, wherein the first number is fourteen.

48. The article of manufacture of claim 35, wherein the predetermined bit pattern comprises "111", wherein each uncoded data block comprises sixteen bits, and wherein each encoded data block comprises seventeen bits.

49. The article of manufacture of claim 48, wherein the first number is twenty-one.

50. The article of manufacture of claim 48, wherein a correspondence of uncoded to encoded data blocks comprises a finite state code scheme.

51. The article of manufacture of claim 35, wherein the predetermined bit pattern comprises either "0100" or "0010", wherein each uncoded data block comprises nine bits and wherein each encoded data block comprises ten bits.

52. The article of manufacture of claim 51, wherein the first number is twelve.

53. The article of manufacture of claim 35, wherein the predetermined bit pattern comprises either "0100" or "0010", wherein each uncoded data block comprises sixteen bits.

54. The article of manufacture of claim 53, wherein each encoded data block comprises seventeen bits and wherein the first number comprises nineteen bits.

55. The article of manufacture of claim 53, wherein a correspondence of uncoded to encoded data blocks comprises a finite state code scheme and wherein the first number is fifteen.

56. The article of manufacture of claim 35, wherein the predetermined bit pattern is included in one encoded data block or spans two encoded data blocks.

57. An article of manufacture including code for storing input groups of uncoded binary data on a storage medium, wherein the code is capable of causing operations comprising:
  receiving a plurality of uncoded data blocks in a data stream;
  generating one corresponding encoded data block for each uncoded data block, wherein an encoded data stream obtained from concatenating successive encoded blocks includes a predetermined bit pattern comprising a plurality of bits, wherein the bit pattern always occurs within a first number of bits and two occurrences of a "1" and "0" occur within a second number of bits, wherein the first number is greater than the second number; and
  storing the encoded data steam on the storage medium.

58. An article of manufacture including code for storing input groups of uncoded binary data on a storage medium, wherein the code is capable of causing operations comprising:
  receiving a plurality of uncoded data blocks in a data stream;
  generating one corresponding encoded data block for each uncoded data block, wherein an encoded data stream obtained from concatenating successive encoded blocks includes a predetermined bit pattern comprising a plurality of bits, wherein the bit pattern always occurs within a first number of bits and two occurrences of a "1" and "0" occur within a second number of bits; and storing the encoded data stream on the storage medium, wherein the encoded data block can be used in partial response and extended partial response systems.

59. A system for storing input groups of uncoded binary data on a storage medium, comprising:

means for receiving a plurality of uncoded data blocks in a data stream;

means for generating one corresponding encoded data block for each uncoded data block, wherein an encoded data stream obtained from concatenating successive encoded blocks includes a predetermined bit pattern comprising a plurality of bits, wherein the bit pattern always occurs within a first number of bits and two occurrences of a "1" and "0" occur within a second number of bits; and means for storing the encoded data stream on the storage medium, wherein the encoded data block can be used in partial response and extended partial response systems.

* * * * *